US009389066B2

(12) United States Patent
Tabuchi et al.

(10) Patent No.: US 9,389,066 B2
(45) Date of Patent: *Jul. 12, 2016

(54) LENS POSITION DETECTING CIRCUIT AND METHOD

(71) Applicant: Semiconductor Components Industries, LLC, Phoenix, AZ (US)

(72) Inventors: Yoshihisa Tabuchi, Gifu-ken (JP); Yasunori Nagata, Gifu-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/249,476

(22) Filed: Apr. 10, 2014

(65) Prior Publication Data

US 2014/0218752 A1 Aug. 7, 2014

Related U.S. Application Data

(63) Continuation of application No. 13/713,951, filed on Dec. 13, 2012, now Pat. No. 9,074,876.

(30) Foreign Application Priority Data

Dec. 13, 2011 (JP) .................................. 2011-272017

(51) Int. Cl.
*G01B 11/14* (2006.01)
*G01J 1/18* (2006.01)
*G01B 11/00* (2006.01)
*G02B 27/64* (2006.01)

(52) U.S. Cl.
CPC .............. *G01B 11/14* (2013.01); *G01B 11/002* (2013.01); *G01J 1/18* (2013.01); *G02B 27/646* (2013.01); *G03B 2205/0007* (2013.01)

(58) Field of Classification Search
None
See application file for complete search history.

(56) References Cited

U.S. PATENT DOCUMENTS

| 3,214,594 A | 10/1965 | Thomson |
| 4,693,597 A | 9/1987 | Shiomi et al. |
| 5,631,817 A | 5/1997 | Minami |
| 6,043,934 A | 3/2000 | Hirunuma et al. |

(Continued)

FOREIGN PATENT DOCUMENTS

| JP | 03115803 A | 5/1991 |
| JP | 04125508 A | 4/1992 |

(Continued)

OTHER PUBLICATIONS esp@cenet Patent Abstract for Japanese Publication No. 2009-128400, publication date Jun. 11, 2009. (1 page).

(Continued)

*Primary Examiner* — Gordon J Stock, Jr.
(74) *Attorney, Agent, or Firm* — Rennie William Dover

(57) ABSTRACT

A position of a lens is detected by detecting, using a phototransistor, light that is emitted from a photodiode and that varies depending on lens position. A control unit divides a moving range of the lens into a plurality of areas, approximates a relationship between lens positions and current of the phototransistor for each of the areas, corrects a current of the phototransistor using the approximated relationship so as to obtain a corrected detection current having a linear relationship with respect to lens positions, and detects the position of the lens using the obtained corrected detection current.

18 Claims, 4 Drawing Sheets

(56) References Cited

U.S. PATENT DOCUMENTS

| | | | |
|---|---|---|---|
| 6,201,234 | B1 | 3/2001 | Chow et al. |
| 6,586,719 | B1 | 7/2003 | Bartzke et al. |
| 7,612,947 | B2 | 11/2009 | Helwegen et al. |
| 7,667,186 | B2* | 2/2010 | Kauhanen ............... G01D 5/28 250/221 |
| 8,509,611 | B2* | 8/2013 | Saito ...................... G02B 7/028 318/634 |
| 9,074,876 | B2* | 7/2015 | Tabuchi ................. G01B 11/14 |
| 2008/0278613 | A1 | 11/2008 | Hunter et al. |
| 2009/0128229 | A1 | 5/2009 | Watanabe et al. |
| 2009/0153679 | A1 | 6/2009 | Nagata et al. |
| 2009/0160958 | A1 | 6/2009 | Yamada et al. |
| 2009/0207236 | A1 | 8/2009 | Feda |
| 2009/0295986 | A1* | 12/2009 | Topliss ................... F03G 7/065 348/374 |
| 2010/0096535 | A1 | 4/2010 | Karasikov et al. |
| 2011/0193977 | A1 | 8/2011 | Yamada et al. |
| 2012/0097837 | A1* | 4/2012 | Ohno ................... G01B 11/026 250/206.1 |
| 2012/0154550 | A1 | 6/2012 | Takagi et al. |
| 2012/0154614 | A1 | 6/2012 | Moriya et al. |
| 2012/0163784 | A1* | 6/2012 | Saito .................... G02B 27/646 396/55 |
| 2012/0327293 | A1 | 12/2012 | Ollila et al. |

FOREIGN PATENT DOCUMENTS

| | | |
|---|---|---|
| JP | 2002048595 A | 2/2002 |
| JP | 2004147025 A | 5/2004 |
| JP | 2004239917 A | 8/2004 |
| JP | 2006-227274 A | 8/2006 |
| JP | 2007093495 A | 8/2007 |
| JP | 2009128400 A | 6/2009 |
| JP | 2009-1 56947 A | 7/2009 |
| JP | 2009-145634 A | 7/2009 |
| JP | 2009-151203 A | 7/2009 |
| JP | 2010-032965 A | 2/2010 |
| JP | 2011-065140 A | 3/2011 |

OTHER PUBLICATIONS esp@cenet Patent Abstract for Japanese Publication No. 2009-156947, publication date Jul. 16, 2009. (1 page).

esp@cenet Patent Abstract for Japanese Publication No. 2006-227274, publication date Aug. 31, 2006. (1 page).

esp@cenet Patent Abstract for Japanese Publication No. 2009-145634, publication date Jul. 2, 2009. (1 page).

esp@cenet Patent Abstract for Japanese Publication No. 2009-151203, publication date Jul. 9, 2009. (2 pages).

esp@cenet Patent Abstract for Japanese Publication No. 2010-032965, publication date Feb. 12, 2010. (1 page).

esp@cenet Patent Abstract for Japanese Publication No. 2011-065140, publication date Mar. 31, 2011. (1 page).

* cited by examiner

LENS POSITION DETECTING CIRCUIT AND METHOD

The present application is a continuation application of U.S. patent application Ser. No. 13/713,951 filed on Dec. 13, 2012, by Yoshihisa Tabuchi et al., titled "Lens Position Detection Circuit" which is hereby incorporated by reference in its entirety, and priority thereto for common subject matter is hereby claimed.

TECHNICAL YIELD

The present invention relates to a lens position detecting circuit that detects a position of a lens by detecting, using a phototransistor, light that is emitted from a photodiode and that varies depending on lens position.

BACKGROUND ART

Conventionally, various cameras are provided with a vibration compensation function. The vibration compensation is achieved by moving the lens in accordance with camera movement to thereby obtain an image in which vibrations are compensated for. In order to execute this vibration compensation, the lens must be driven appropriately, and this requires accurate detection of the lens position.

For detecting positions of various components, there has been provided an arrangement in which a magnet is mounted on the target component and a Hall element for detecting this magnet is used. A Hall element is also being used for detecting a lens position.

CITATION LIST

Patent Literature

[Patent Literature 1] JP 2009-128400 A
[Patent Literature 2] JP 2009-156947 A
[Patent Literature 3] JP 2006-227274 A

SUMMARY OF INVENTION

Technical Problem

However, a Hall element is relatively costly. Moreover, for applications such as cameras in cell phones and smartphones where space reduction is required, or special device shapes are desired by users, it may not be possible to sufficiently satisfy such requirements or desires when a Hall element is used. It is therefore necessary to consider alternative detection methods. For example, one alternative detection method may be an optical detection method, in which a photodetector such as a photo-reflector or a photo-interrupter may be used. A photo-reflector is a device in which light emitted from a photodiode is reflected off a target and the reflected light is detected using a phototransistor. By configuring such that the received light amount at the phototransistor varies depending on lens position, the position of the lens can be detected.

While it is convenient when the relationship between lens positions and output from the phototransistor of the photo-reflector is linear, there are cases in which this relationship is nonlinear. For example, there have been confirmed cases in which the relationship becomes nonlinear along with changes in the positional relationship between the detection target provided for lens detection and the photo-reflector, and it is necessary to carry out appropriate positional detection for such cases.

Solution to Problem

The present invention provides a lens position detecting circuit that detects a position of a lens by detecting, using a phototransistor, light that is emitted from a photodiode and that varies depending on lens position. The lens position detecting circuit comprises: a correcting unit that divides a moving range of the lens into a plurality of areas, approximates a relationship between lens positions and current of the phototransistor for each of the areas, and corrects a current of the phototransistor using the approximated relationship so as to obtain a corrected detection current having a linear relationship with respect to lens positions; and a detecting unit for detecting the position of the lens using the obtained corrected detection current.

Preferably, the correcting unit linearly approximates the relationship between lens positions and current of the phototransistor for each area.

Advantageous Effects of Invention

According to the present invention, since the detection current is corrected and a linear output can thereby be obtained, lens position detection can be performed effectively using a nonlinear output.

DESCRIPTION OF EMBODIMENTS

The embodiments of the present invention are described below with reference to the attached drawings.

Figure 1:
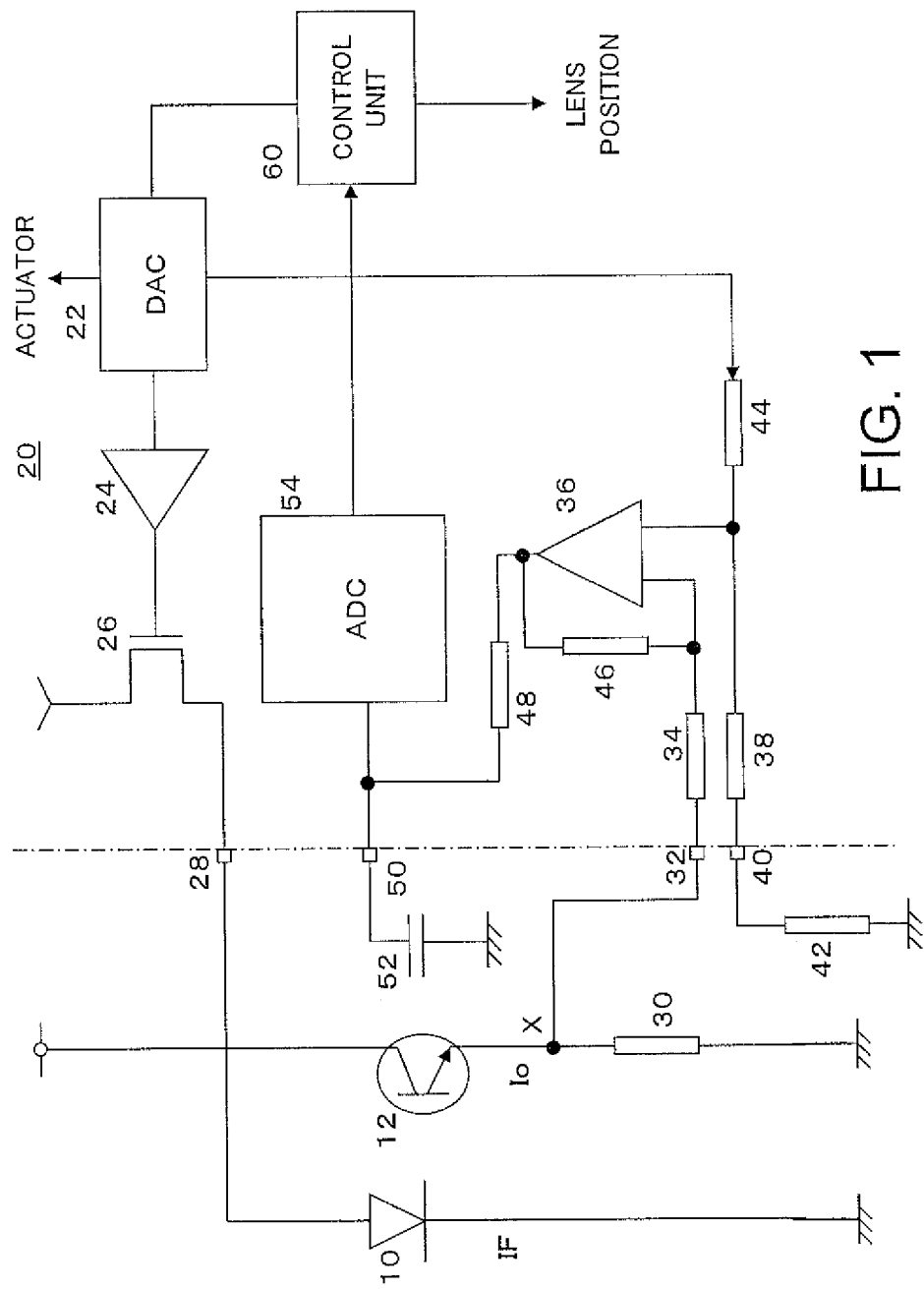
FIG. 1 is a diagram showing a configuration of a lens position detecting circuit according to an embodiment of the present invention.

FIG. 1 is a diagram showing a configuration of a lens position detecting circuit according to an embodiment of the present invention. A photo-reflector serving as a photodetector includes a photodiode 10 and a phototransistor 12, which are provided external to a semiconductor integrated circuit 20. When light emitted from the photodiode 10 is reflected off a detection target and the reflected light is introduced into the phototransistor 12, a current according to the incident light amount flows through the phototransistor 12. Even while the amount of emitted light from the photodiode 10 remains constant, when the detection target is moved in accordance with the lens position, the received light amount at the phototransistor 12 varies. By detecting the amount of current through the phototransistor 12, the lens position is detected. Since the lens position should be detected along two directions of x and y, two photo-reflectors are provided to detect the lens position in both the x and y directions. A reflector plate or the like attached to the lens serves as the detection target.

In the semiconductor integrated circuit 20, based on input data concerning a constant current to be caused to flow through the photodiode 10, a DAC 22 outputs a corresponding constant voltage. The output from the DAC 22 is stabilized by an amplifier 24 and subsequently supplied to the gate of an n-channel output transistor 26. The drain of the output transistor 26 is connected to a power supply, while the source of the output transistor 26 is connected via a terminal 28 to the anode of the externally-provided photodiode 10. The cathode of the photodiode 10 is grounded. Accordingly, a constant current IF in accordance with the data input to the DAC 22 is supplied from the power supply to the photodiode 10 via the output transistor 26. It may be preferable to provide a means for controlling the constant current IF, which may include a structure that detects a current flowing through the output transistor 26 and provides feedback control to the data input to the DAC 22.

The collector of the phototransistor 12 is connected to a power supply, while the emitter of the phototransistor 12 is grounded via a current detecting resistor 30. Accordingly, as described above, a current in accordance with the light amount received at the phototransistor 12 flows through the phototransistor 12 and the current detecting resistor 30. Further, a detection voltage ("point-X voltage") in accordance with the current flowing through the phototransistor 12 is obtained at point X (i.e., point of connection between the phototransistor 12 and the current detecting resistor 30) located above the current detecting resistor 30.

The point-X voltage is introduced into the semiconductor integrated circuit 20 via a terminal 32, and input to the negative input terminal of an operational amplifier 36 via a resistor 34. The positive input terminal of the operational amplifier 36 is connected via a resistor 38, a terminal 40, and an external resistor 42, to ground outside the semiconductor integrated circuit 20. Further, the positive input terminal of the operational amplifier 36 is also connected to one end of a resistor 44. To the other end of this resistor 44, the DAC 22 supplies a reference voltage indicative of the phototransistor 12 current obtained when the lens is located at a reference position. As such, the voltage at the positive input terminal of the operational amplifier 36 is equal to a voltage ("set voltage") obtained by dividing the reference voltage by the resistor 44 and a sum of the resistor 38 and the external resistor 42. The reference voltage is set according to a reference voltage data supplied to the DAC 22. The set voltage at the positive input terminal of the operational amplifier 36 can be adjusted by changing the reference voltage data input to the DAC 22 or by changing the resistance value of the external resistor 42.

The output terminal of the operational amplifier 36 is connected as feedback to its negative input terminal via a resistor 46. Accordingly, the voltage at the output terminal of the operational amplifier 36 is equal to a voltage obtained by amplifying a voltage difference between the positive and negative input terminals in accordance with the resistance values of the resistors 34 and 46.

Further, the output terminal of the operational amplifier 36 is also connected via a resistor 48 and a terminal 50 to a capacitor 52, which has its other end connected to ground outside the semiconductor integrated circuit 20. With this arrangement, a voltage signal obtained by integrating (subjecting to low-pass filtering) the output from the operational amplifier 36 is obtained at the terminal 50. This voltage signal of the terminal 50 is input to the ADC 54. In other words, the ADC 54 receives input of a voltage corresponding to a difference between the detection voltage, which corresponds to the amount of current that flows in the phototransistor 12 in accordance with the received light amount, and the set voltage. Therefore, in an output from the ADC 54, data in accordance with the lens position can be obtained.

The output from the ADC 54 is supplied to a control unit 60, and the lens position is identified in the control unit 60. The control unit 60 performs various controls in accordance with the obtained lens position, such as control of a lens driving actuator. The actuator may be controlled by, for example, driving an H-Bridge driver with a PWM pulse.

According to the configuration of the present embodiment, the current Io of the phototransistor 12 is converted into a voltage and compared with the set voltage, and the comparison result is used to detect the lens position. Although a conversion is made, the detection of the lens position is in fact made on the basis of the current Io.

When the control unit 60 detects the lens position based on a detected voltage supplied from the ADC 54, the control unit 60 corrects the detected voltage so as to obtain a corrected detected voltage having a linear relationship with respect to lens positions, and then performs lens position detection based on the corrected detected voltage.

More specifically, when there is a deviation from a set configuration in terms of the distance between the detection target (which reflects light from the photodiode 10 during lens position detection) and the photo-reflector (the photodiode 10 and the phototransistor 12), or in terms of the position of the detection target within the moving surface, the relationship of the photo-reflector output with respect to lens positions become nonlinear.

Figure 2:
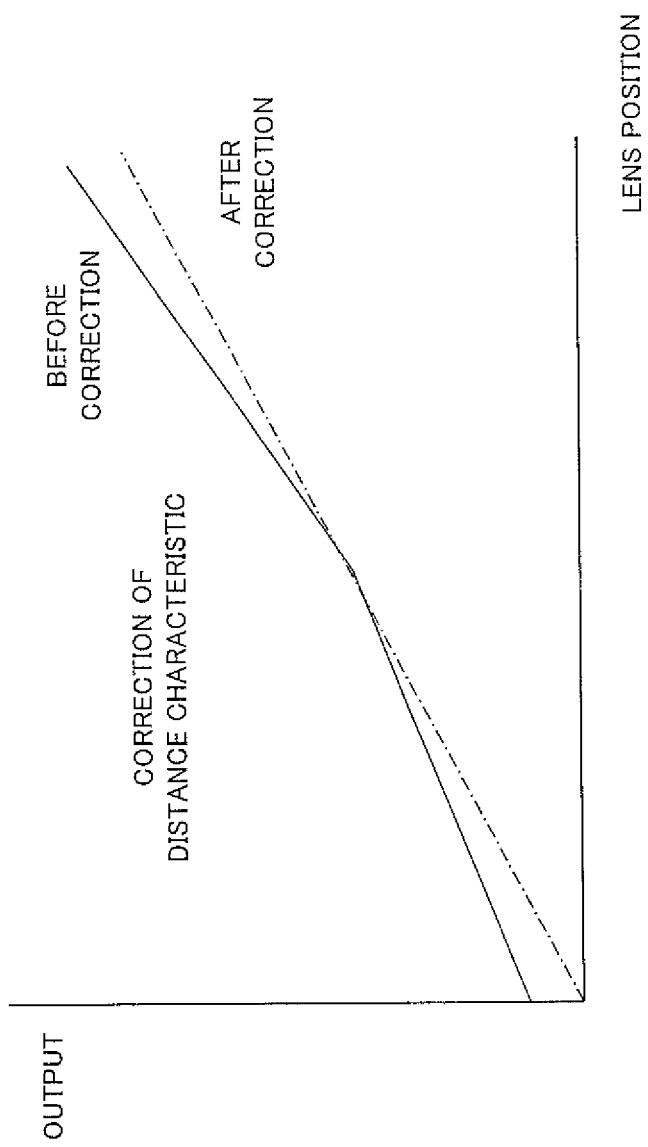
FIG. 2 is a diagram showing a distance characteristic of the output.
Figure 3:
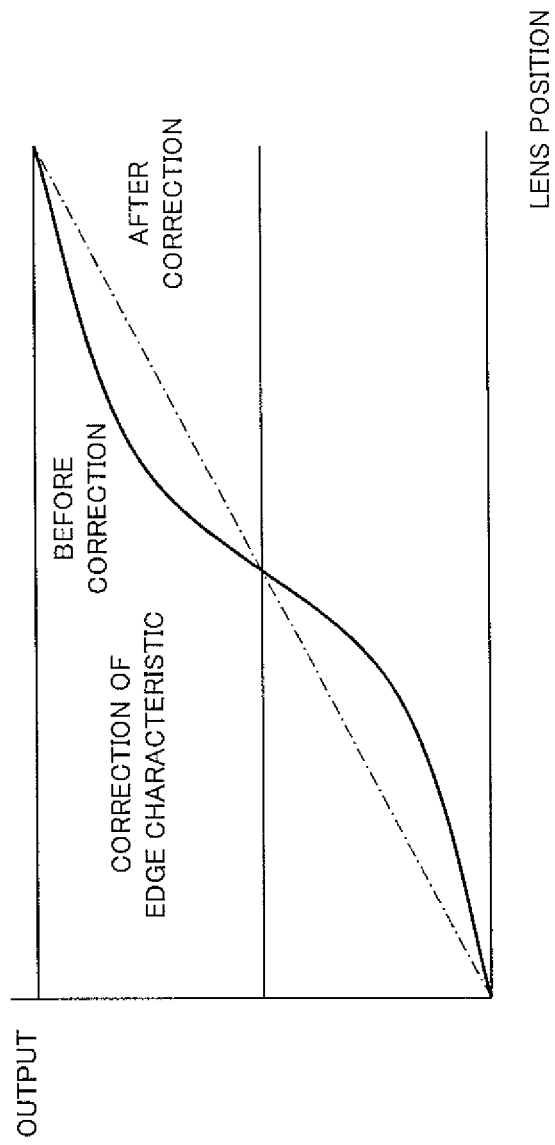
FIG. 3 is a diagram showing an edge characteristic of the output.

For example, when the distance is different from the set distance, the output characteristic changes near the midpoint of the lens positions, as shown in FIG. 2. Further, when the detection target is positionally deviated within the moving surface resulting in influences caused by the edges of the detection target, the output characteristic becomes different respectively for lens positions toward one side, lens positions in the middle part, and lens positions toward the other side, as shown in FIG. 3. It should be noted that such alterations in the output characteristic vary depending on factors such as the shape and the set position of the detection target, and that the output characteristic does not necessarily resemble those shown in FIGS. 2 and 3.

According to the present embodiment, the output of the photo-reflector is corrected so that the obtained corrected output has a linear relationship with respect to lens positions.

In this embodiment, the output is divided into three areas. In each area, it is assumed that the relationship between lens positions and the photo-reflector output (i.e., detection current of the phototransistor 12) is linear, and an actual output is corrected to a corrected output having a linear relationship to lens positions.

Figure 4:
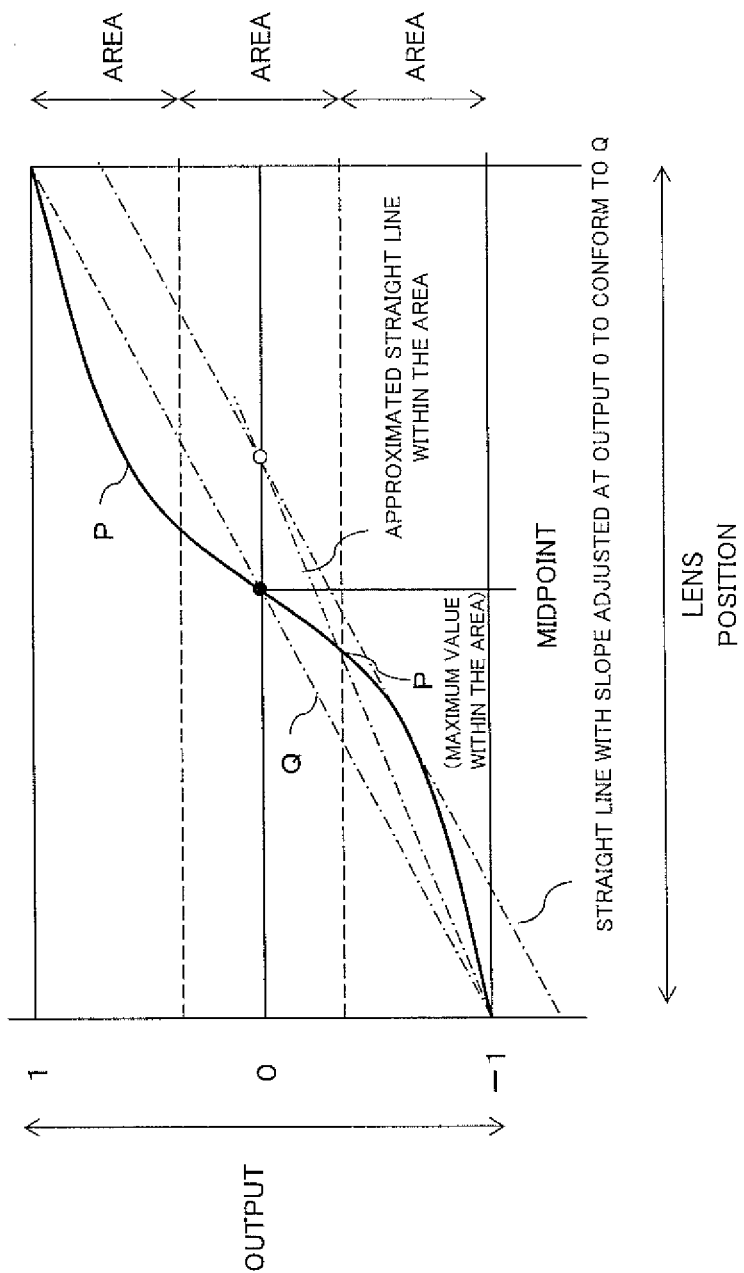
FIG. 4 is a diagram explaining the correction details.

FIG. 4 shows example correction details, for the lowermost area. First, concerning the entire detection range, based on outputs for the range from L0 to Lmax, a straight line indicating a relationship of those outputs with respect to the corresponding lens positions is determined. In this example, the outputs have numerical values ranging from −1 to +1.

When the lens position is denoted by x, the corrected output Q equals ax. Here, the slope a is a slope obtained by dividing the range of change of the outputs by the range of change of the lens position.

In FIG. 4, the curve shown by a bold line is the output P obtained corresponding to the lens positions. An output shown by P corresponding to a lens position is corrected to an output shown by Q for that lens position. A corrected output Q for the same position as an output P is obtained by performing calculations in each area to change the slope and make a shift corresponding to the intercept, which can be performed according to the equation Q=aP+b. In the calculations, the coefficients a and b are differed for the respective areas.

In any case, the output P for the lens positions x is known, and what is required here is that the output corresponding to the lens positions x equals Q. Accordingly, it is simply sufficient to determine the relationship between the lens positions and the output P in each area, and to set for each area a relational expression for converting the output P into the corrected output Q.

Here, in order to achieve position detection with high accuracy, the output Q for the midpoint of lens movement is set to the midpoint of the output. An intersection point between an approximated straight line in each area and the midpoint of the output is determined, and calculations are performed to obtain a straight line having a slope adjusted at this intersection point to conform to the slope of Q. The calculated straight line is then shifted according to its intercept so as to match the straight line position of Q. In this way, conversion equations for all of the areas can be obtained in the same manner.

Concerning the areas into which the output is divided, as the number of the areas is increased, the linear approximation within each area becomes more accurate. In an alternative embodiment, the approximation within each area may be an approximation to a polynomial expression.

As described above, according to the present embodiment, when the output from the photo-reflector is nonlinear with respect to the positions of the detection target corresponding to the lens, the photo-reflector output is corrected so that the output has a linear relationship to the lens positions. Accordingly, the corrected output as is can be employed as a signal expressing the lens position.

The lens position is detected along the two directions of x and y. For this purpose, the photodiode 10 and the phototransistor 12 are provided in two sets for the x and y directions, respectively, and the two detected position values are recognized in the control unit 60. In this case, temperature detection may be performed using the forward drop voltage of only one of the photodiodes 10. Further, it is desirable to have the DAC 22 and the ADC 54 carry out processing for both the x and y directions in a time-divided manner.

REFERENCE SIGNS LIST

10 photodiode; 12 phototransistor; 20 semiconductor integrated circuit; 24 amplifier; 26 output transistor; 28, 32, 40, 50, terminal; 30 current detecting resistor; 34, 38, 42, 44, 46, 48 resistor; 36 operational amplifier; 52 capacitor; 60 control unit.

The invention claimed is:

1. A method for detecting a position of a lens, comprising:
generating an approximated relationship between the position of the lens and a current;
generating a corrected detection current in response to the approximated relationship; and
using the corrected detection current to determine the position of the lens.

2. The method of claim 1, further including dividing a moving range of the lens into a plurality of areas before generating the approximated relationship between the position of the lens and a current.

3. The method of claim 1, further including generating the corrected detection current to linearly approximate the relationship between the lens position and the current.

4. The method of claim 3, wherein the current is a current flowing through a phototransistor.

5. The method of claim 4, further including using a digital to analog converter to generate a reference voltage indicative of the current flowing through the phototransistor in response to the lens being located at a reference position.

6. The method of claim 5, further including:
using the digital to analog converter to generate a constant voltage; and
generating a constant current in a photodiode phototransistor in response to the constant voltage.

7. The method of claim 5, further including:
voltage dividing the reference voltage to generate a set voltage;
generating a detection voltage in response to the current flowing through the phototransistor; and
using the set voltage and the detection voltage to generate a difference voltage.

8. The method of claim 7, further including providing an amplifier having an inverting input, a noninverting input and an output, the amplifier configured in a negative feedback configuration to generate the difference voltage, wherein the inverting input is coupled to receive the detection voltage and the noninverting input is coupled to receive the set voltage.

9. The method of claim 7, further including:
integrating the difference voltage to generate an integrated voltage; and
generating an input signal to a control unit in response to the integrated voltage.

10. The method of claim 9, further including using the control unit to identify the lens position in response to the input signal to the control unit.

11. The method of claim 10, further including controlling a lens driving actuator in response to a control signal generated by the control unit.

12. A method for detecting a position of a lens, comprising:
converting a current of a phototransistor into a first voltage in response to the current of the phototransistor flowing through a first resistor;
generating a detection voltage from the first voltage;
generating a comparison result in response to comparing the detection voltage with a set voltage by
generating the set voltage at a first input of an amplifier in a negative feedback configuration;
generating the detection voltage at a second input of the amplifier in the negative feedback configuration;
generating the comparison result at an output of the amplifier; and
using the comparison result to determine the position of the lens.

13. The method of claim 12, wherein using the comparison result to determine the position of the lens includes integrating the comparison result to generate an integrated voltage.

14. The method of claim 13, further including generating a control signal in response to the integrated voltage.

15. A method for detecting a position of a lens, comprising:
dividing a moving range of the lens into a plurality of areas;
generating an approximated relationship between the position of the lens and a current flowing through a phototransistor for each of the areas;
generating a corrected detection current in response to the approximated relationship for each of the areas; and
using the corrected detection current to determine the position of the lens for each of the areas.

16. The method of claim 15, wherein generating the corrected detection current includes linearly approximating the corrected detection current from a relationship between the lens positions for each of the areas and the current flowing through the phototransistor for each of the areas.

17. The method of claim 16, wherein generating the corrected detection current includes:
generating a first reference voltage;
generating a detection voltage in response to the current flowing through the phototransistor;

amplifying a difference between the detection voltage and the first reference voltage to generate an amplified difference signal;
integrating the amplified difference signal;
generating a digital signal from the integrated amplified difference signal; and
generating a control signal in response to the digital signal.

18. The method of claim 17, further including generating an actuator signal in response to the control signal, wherein the actuator signal adjusts a position of the lens.

\* \* \* \* \*